US012797699B2

(12) United States Patent
Luffman

(10) Patent No.: US 12,797,699 B2
(45) Date of Patent: Nov. 17, 2026

(54) GOLF CLUB CARRIER

(71) Applicant: Ben Luffman, New South Wales (AU)

(72) Inventor: Ben Luffman, New South Wales (AU)

( * ) Notice: Subject to any disclaimer, the term of this patent is extended or adjusted under 35 U.S.C. 154(b) by 0 days.

(21) Appl. No.: 18/030,776

(22) PCT Filed: Oct. 7, 2021

(86) PCT No.: PCT/AU2021/051171
§ 371 (c)(1),
(2) Date: Apr. 7, 2023

(87) PCT Pub. No.: WO2022/073070
PCT Pub. Date: Apr. 14, 2022

(65) Prior Publication Data
US 2024/0009529 A1 Jan. 11, 2024

(30) Foreign Application Priority Data
Oct. 7, 2020 (AU) ................................ 2020903639

(51) Int. Cl.
*A63B 55/40* (2015.01)
*B62B 9/26* (2006.01)

(52) U.S. Cl.
CPC ................ *A63B 55/40* (2015.10); *B62B 9/26* (2013.01); *A63B 2209/10* (2013.01); *B62B 2202/406* (2013.01)

(58) Field of Classification Search
CPC ............ A63B 2209/10; A63B 2210/00; A63B 2210/50; A63B 55/40; A63B 57/20; A63B 1/00; A63B 2071/0694; A63B 2225/68; A63B 55/00; A63B 55/20; A63B 55/406; A63B 55/408; A63B 55/57; A63B 60/64;
(Continued)

(56) References Cited

U.S. PATENT DOCUMENTS 4,186,859 A * 2/1980 Frankfort ................ A45C 3/04
224/563
4,420,024 A * 12/1983 Clayton ................ A63B 55/40
206/315.6
(Continued)

FOREIGN PATENT DOCUMENTS

| | | |
|---|---|---|
| CA | 2614760 | 5/2009 |
| GB | 2541123 | 8/2019 |

OTHER PUBLICATIONS

International Search Report and the Written Opinion Dated Dec. 13, 2021 From the International Searching Authority Re. Application No. PCT/AU2021/051171. (10 Pages).

*Primary Examiner* — Anthony D Stashick
*Assistant Examiner* — Marcos Javier Rodriguez Molina

(57) ABSTRACT

A golf club carrier (10) for use with a stroller or pram (70). The carrier (10) includes a base (14) and a top (16) with an interior chamber (18). An access opening (20) at the top (16) provides access to the interior chamber (18). The interior chamber (18) is configured to receive golf clubs via the access opening (20), so that, in use in a holding position the clubs are at least partially disposed within the interior chamber (18). The carrier (10) further includes an attachment system (50), which is optionally adjustable, for releasably securing the carrier (10) to the stroller or pram (70). The carrier (10) is preferably formed of a flexible material so that it can be rolled or folded for storage.

12 Claims, 5 Drawing Sheets

(58) Field of Classification Search
CPC ........ B62B 2202/404; B62B 2202/406; B62B 9/26; B62B 2202/40; B62B 5/087; B62B 7/08; B62B 7/14; A45C 3/04; A45C 9/00; A45F 3/02
USPC ............ 150/159; 206/1.5, 150, 315.1, 315.2, 206/315.3, 315.4, 315.5, 315.6, 315.7, 206/315.8, 38, 579, 810, 159; 190/107; 224/409, 563, 572, 579, 585, 610, 612, 224/614; 280/47.35, 642, DIG. 6; 294/141; 383/4
See application file for complete search history.

(56) References Cited

U.S. PATENT DOCUMENTS

| | | | | | |
|---|---|---|---|---|---|
| 5,702,038 | A * | 12/1997 | Miller | A45C 3/04 | 150/108 |
| 5,941,437 | A * | 8/1999 | Okumura | A45F 3/02 | 224/586 |
| 6,629,601 | B1 * | 10/2003 | Russell | A63B 55/404 | 206/315.6 |
| 6,640,970 | B1 * | 11/2003 | Townsend, Jr. | A63B 55/408 | 206/315.6 |
| 2012/0319371 | A1 * | 12/2012 | Joubert | B62B 9/26 | 280/47.35 |
| 2013/0292931 | A1 * | 11/2013 | Bollmann | B60R 9/00 | 280/769 |
| 2018/0128572 | A1 * | 5/2018 | Carter | F41C 33/06 | |
| 2019/0344137 | A1 * | 11/2019 | Eze | A63B 55/40 | |

* cited by examiner

GOLF CLUB CARRIER

RELATED APPLICATIONS

This application is a National Phase of PCT Patent Application No. PCT/AU2021/051171 having International filing date of Oct. 7, 2021, which claims the benefit of priority of Australia Patent Application No. 2020903639 filed on Oct. 7, 2020. The contents of the above applications are all incorporated by reference as if fully set forth herein in their entirety.

FIELD AND BACKGROUND OF THE INVENTION

This disclosure relates generally to golf equipment, and more particularly to a golf club carrier for use with a stroller or pram for infants or for other types of push carts such as wheelchairs and the like.

Golf has become an increasingly popular pastime for persons of all ages. A problem associated with golf is it is very time-consuming to play the game. This is a disadvantage for people who are busy with other activities, such as for example raising a young family. Such people simply do not have the time to play golf because of the time taken up attending to children's needs.

SUMMARY OF THE INVENTION

In a first aspect, embodiments are disclosed of a golf club carrier for use with a stroller or pram, the carrier comprising a main body which includes a base and a top with an interior chamber therein, an access opening at the top for providing access to the interior chamber, the interior chamber being configured to receive golf clubs therein via the access opening, so that in a holding position, the golf clubs are at least partially disposed within the interior chamber, the carrier further including an attachment system for releasably securing the carrier to the stroller.

In certain embodiments, the main body includes a side wall which surrounds the interior chamber.

In certain embodiments, the side wall is flexible in nature.

In certain embodiments, the side wall comprises two main panels having opposed sides, the sides of each panel being operatively connected together.

In certain embodiments, the base is strengthened relative to the side wall of the main body.

In certain embodiments, the carrier includes a support frame at the top of the main body, the access opening extending through the support frame.

In certain embodiments, the support frame is operatively connected to the side wall.

In certain embodiments, the support frame includes a divider member configured to separate the access opening into a plurality of separate access apertures, each aperture being configured to receive a part of one or more golf clubs therethrough.

In certain embodiments, the divider member is elongated in form and has opposed spaced apart ends, the access apertures being arranged side-by side in a row which extends in a direction between the ends.

In certain embodiments, the golf clubs comprise a shaft and a club head at one end thereof, the interior chamber being sized so that when the golf clubs are in the holding position within the interior chamber the club heads project from the interior chamber through the access opening so as to be disposed externally thereof.

In certain embodiments, the carrier includes a plurality of partitions within the interior chamber for separating the interior chamber into a series of zones.

In certain embodiments, each zone is associated with a respective one of the access apertures.

In certain embodiments, the carrier includes an attachment system for releasably mounting the carrier to the stroller or pram.

In certain embodiments, the attachment system comprises a strap arrangement which can be mounted to the stroller or pram when the carrier is in a fitted position.

In certain embodiments, the strap arrangement is disposed at or in the region of the top of the main body so that in the fitted position the carrier is suspended from the stroller or pram.

In certain embodiments, when the carrier is in the fitted position on the stroller or pram, the carrier is inclined with the base being forwardly disposed relative to the top. The arrangement is such that when the carrier is suspended or hanging from the stroller or pram in the region of the top of the carrier it is free to swing towards or away from the stroller or pram.

In certain embodiments, the attachment system is operatively connected to the support frame.

In certain embodiments, the carrier includes one or more pockets in the main body.

In certain embodiments, the main body is configured so that it can be folded or rolled so that the carrier can adopt a stored position.

BRIEF DESCRIPTION OF THE SEVERAL VIEWS OF THE DRAWINGS

Notwithstanding any other forms which may fall within the scope of the method and apparatus set forth in the summary, specific embodiments of the method and apparatus will now be described by way of example and with reference to the accompanying drawing in which.

DESCRIPTION OF SPECIFIC EMBODIMENTS OF THE INVENTION

Figure 1:
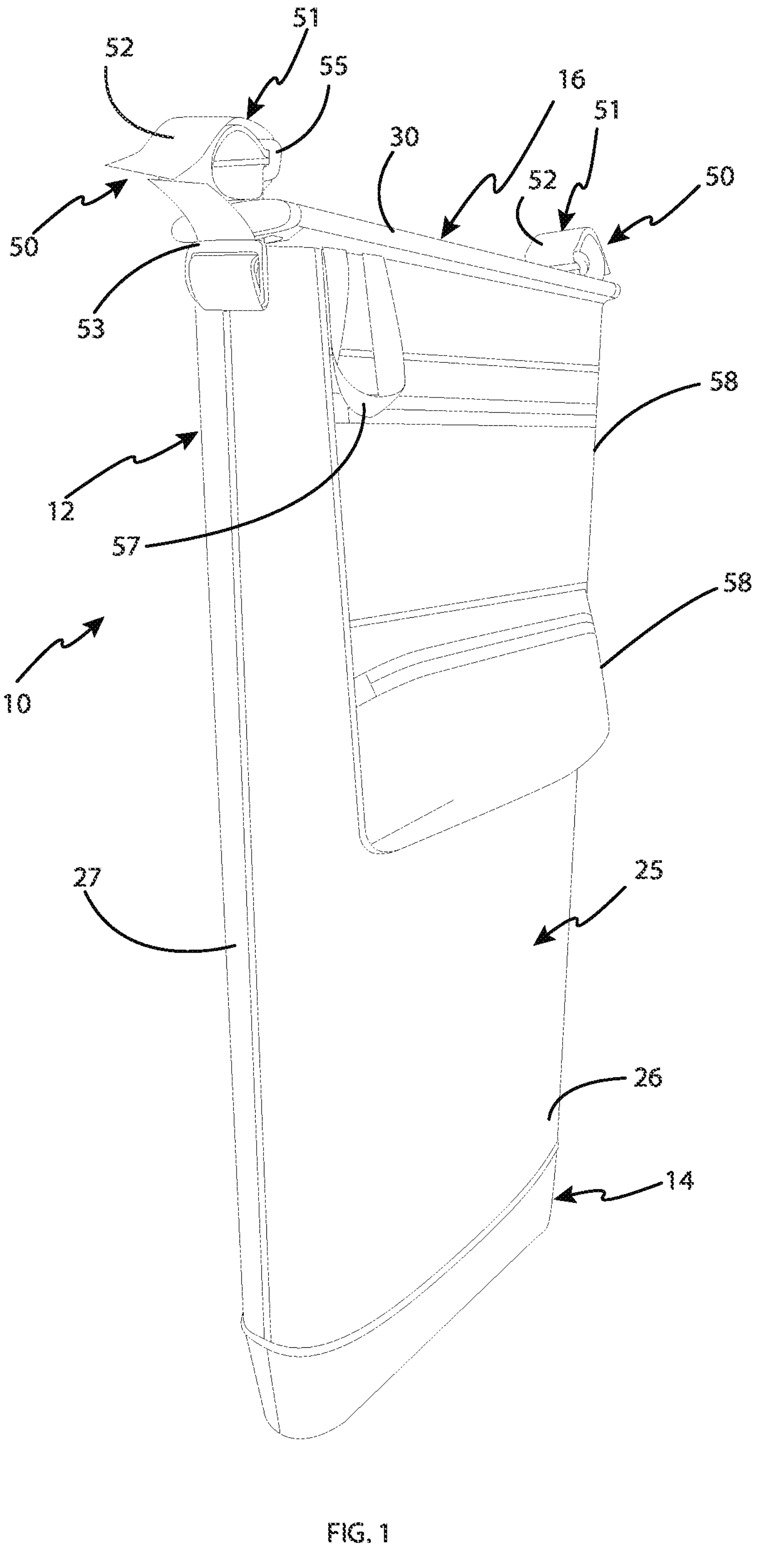
FIG. 1 is a schematic perspective view of a golf club carrier according to one embodiment.
Figure 2:
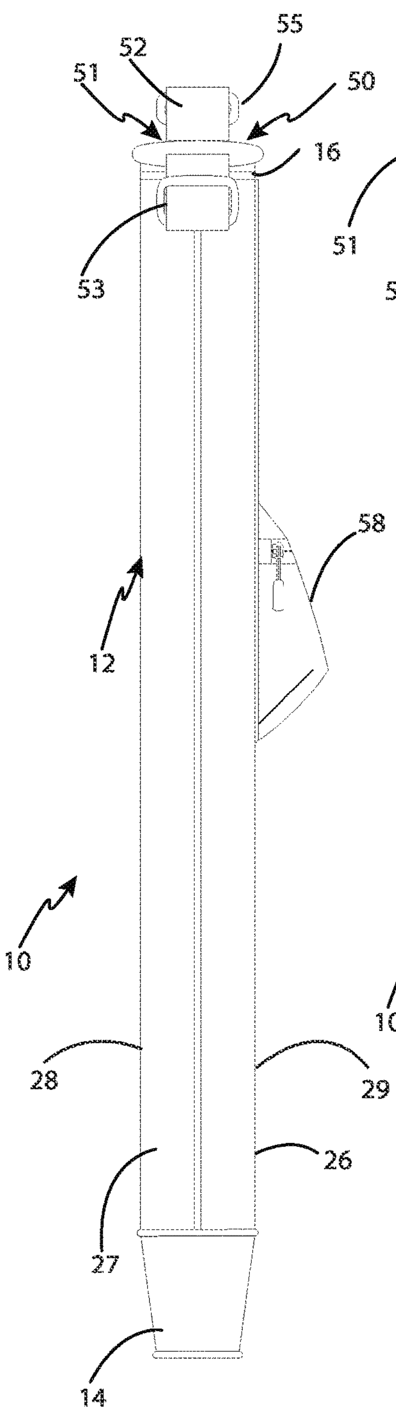
FIG. 2 is a side elevation of the golf club carrier shown in FIG. 1.
Figure 3:
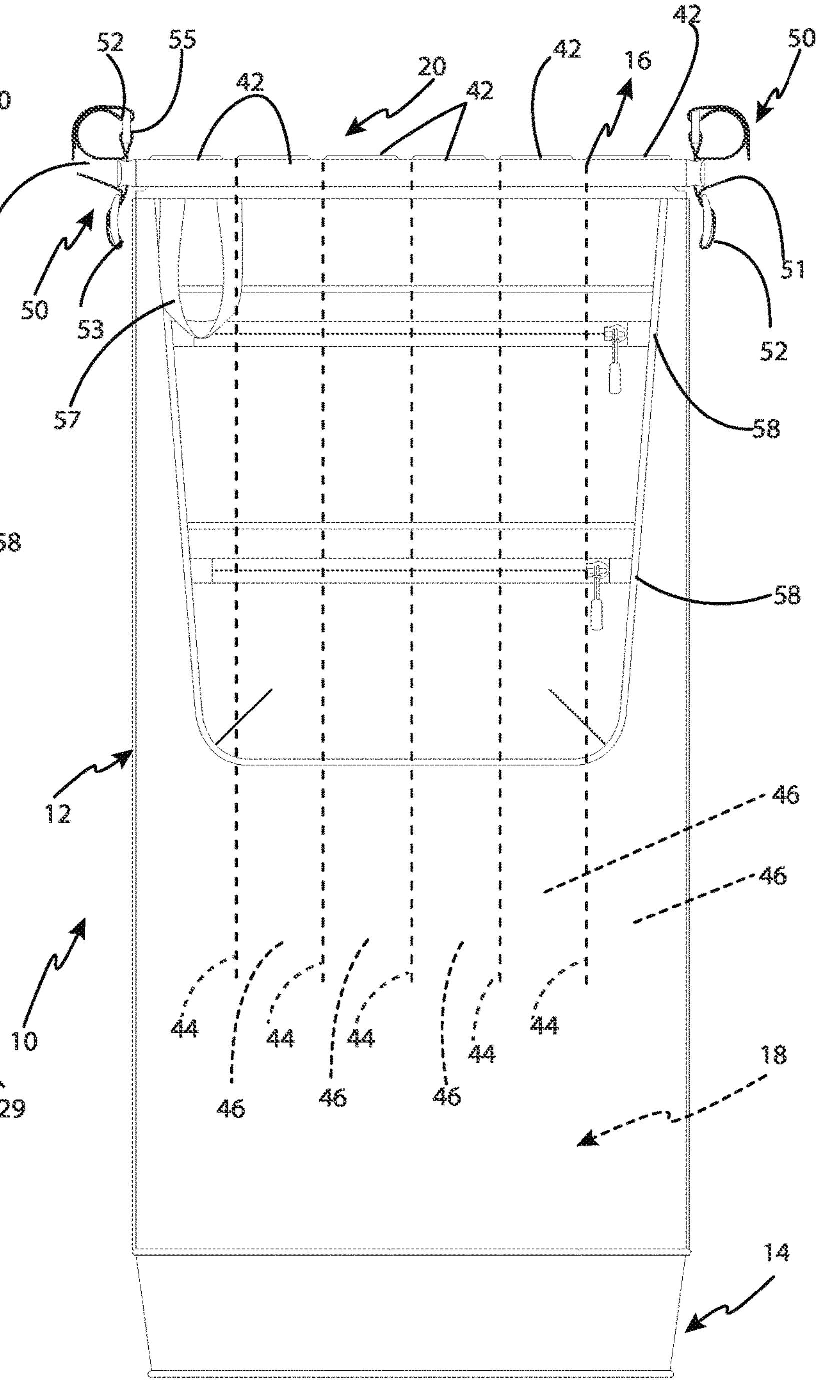
FIG. 3 is a front elevation of the golf club carrier shown in FIGS. 1 and 2.
Figure 4:
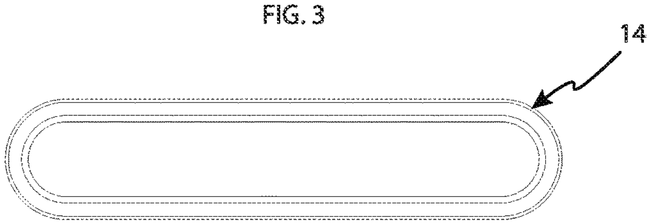
FIG. 4 is an underside view of the golf club carrier shown in FIGS. 1 to 3.
Figure 5:
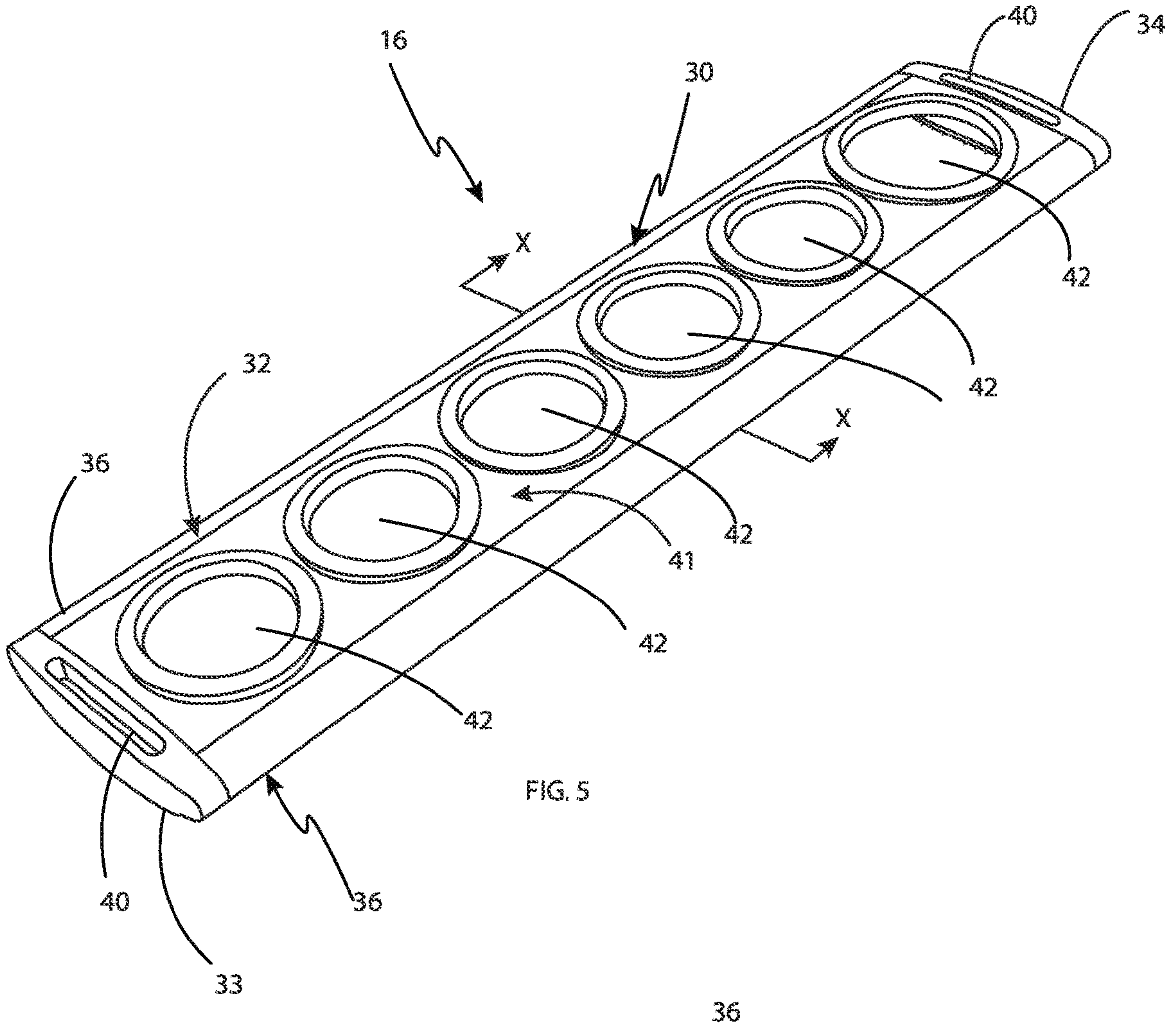
FIG. 5 is a schematic perspective view of a support frame which forms part of the golf club carrier.
Figure 6:
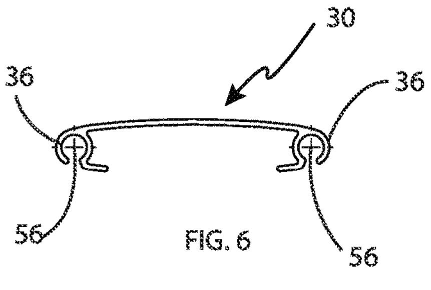
FIG. 6 is a sectional view of taken along the line X-X in FIG. 5.
Figure 7:
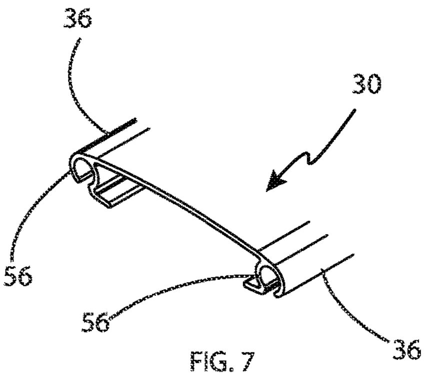
FIG. 7 is an isometric view of the sectional view of FIG. 6.
Figure 8:
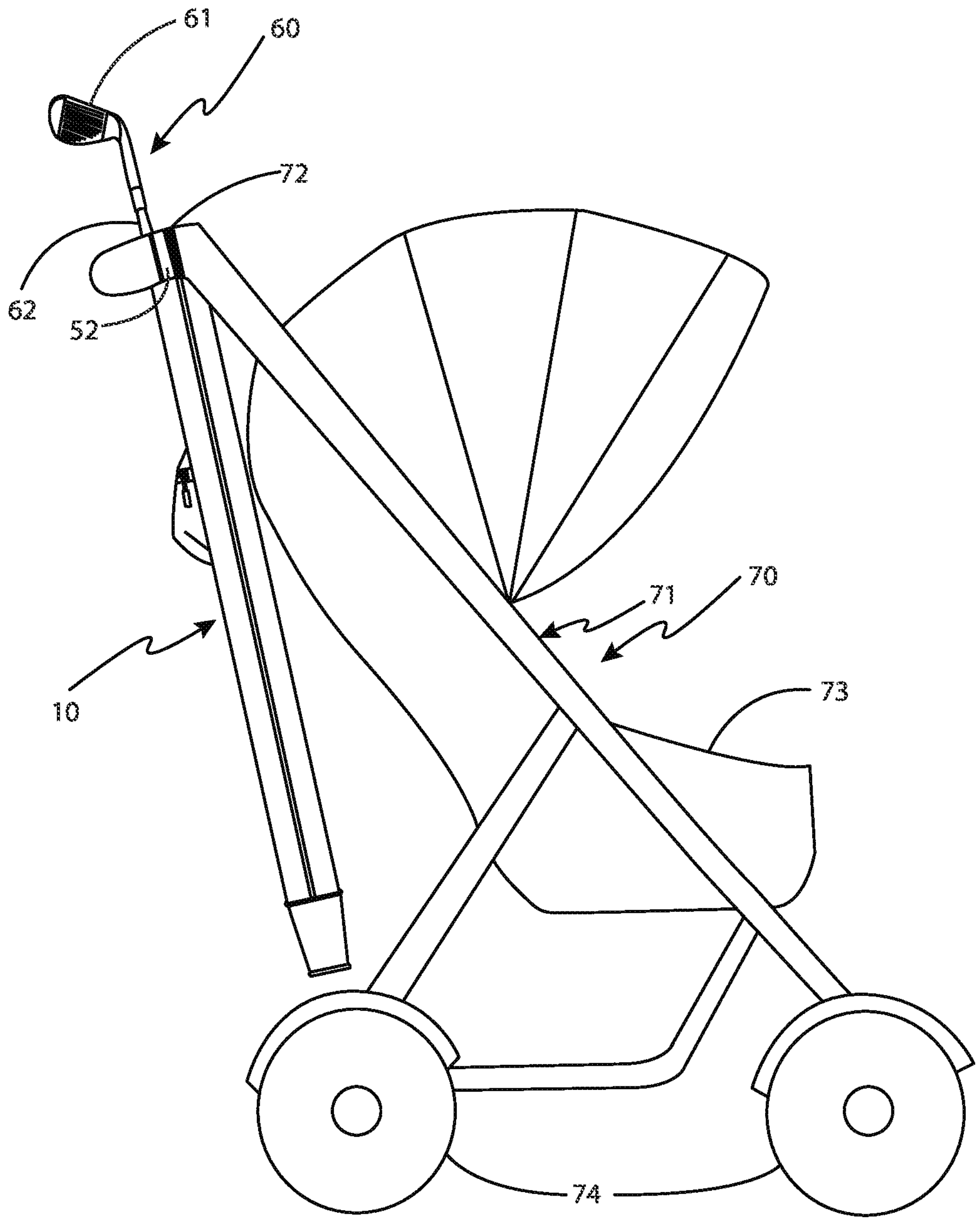
FIG. 8 is a schematic side elevation of the golf club carrier when in a fitted position on a stroller, and, FIG. 9 is a view of the golf club carrier rolled up into a stored position, suitable for storage.

Referring to the drawings, there is illustrated a golf club carrier generally indicated at 10, which is suitable for use with a stroller or pram. An example of a stroller with which the golf club carrier 10 can be used is illustrated in FIG. 8. The stroller 70 comprises a frame 71, which includes a handle 72 supported by surface engaging wheels 74. A seat

73 is mounted to the frame 71, for use by a child. As shown in FIG. 8, the carrier 10 can be mounted to the stroller 70 in a fitted or installed position.

The golf club carrier 10 comprises a main body 12, which includes a base 14 and a top 16, with a side wall 25 extending between the base and the top. The main body 12 is generally in the form of a bag having an interior chamber 18 therein. The side wall 25 comprises two main panels 26 and 27, having sides 28 and 29 operatively secured together, so as to enclose the interior chamber 18. The side wall 25 is flexible in nature and formed from any suitable flexible material. For example, the side wall 25 material may be in the form of nylon material and the like. In one embodiment, the side wall comprises a combination of a main fabric layer of polyester with a polyurethane coating, and, a lighter duty liner fabric layer of the same material. The base 14 may be formed from a heavier duty material in order to provide it with some rigidity and strength so as to maintain its shape. This also assists in enabling the base to withstand forces applied to it by a golf club striking it when being placed within the interior chamber.

An access opening 20 is provided at the top 16, through which golf clubs can be positioned within the interior chamber 18. A golf club 60 is illustrated in FIG. 8, and includes a head 61 and a shaft 62. As can be seen in FIG. 8, when the club 60 is held by the carrier 10, the shaft 62 of the golf club 60 is at least partially disposed within the interior chamber 18 and projects through the opening 20 so that the golf club head 61 is disposed externally of the interior chamber 18.

The carrier 10 further includes a support frame 30 at the top 16 of the main body 12, the access opening 20 extending through the support frame 30. The support frame 30 is operatively connected to an upper region of the side wall 25. The support frame 30 in the form shown, comprises a rigid elongated member 32 having sides 36 and opposed ends 33 and 34. In the embodiment shown, the support frame 30 includes a divider member 41, which separates the access opening 20 into a series of separate access apertures 42. These apertures are adapted to receive one or more golf clubs through each aperture. As shown, the apertures 42 are arranged side-by-side in a row which extends from one end of the support frame to the other. In one embodiment the interior chamber 18 includes a plurality of partition walls 44, which separate the interior chamber 18 into a series of zones 46. The partition walls 44 may be flexible in nature and may for example comprise flexible strips of material. Each zone 46 is associated with a respective one of the access apertures 42. In another embodiment there are no partition walls, the interior chamber providing a single common space for all of the golf clubs. The side wall 25 maybe operatively connected to the support frame 30, by way of for example the use of a keder-type fabric attachment system. To this end, the opposing sides 36 of the support frame 30 each have an elongated slot or groove 56 therein. The slots or grooves 56 are configured to receive a core element which forms part of the attachment system. The core element has a fabric flap secured thereto, and to which the upper part of the side wall 25 can be attached. Such attachment systems are known.

The carrier 10 further includes an attachment system 50 by which the main body of the carrier can be mounted to the stroller or pram 70. As shown in FIG. 8, the support frame 30 of the carrier is mounted to the stroller frame 71 in the region of the handle 72. The attachment system 50 comprises a strap arrangement 51 which includes a plurality of straps 52 and buckles 53 and 55. Buckle 55 allows a strap arrangement 51, which may for example be formed of a hook and loop fastening material, such as Velcro, to be looped back onto itself to provide a secure hold on the frame 71, in such a manner that it may be adjustably fitted to suit the handles and the size/shape of the pram to which it is attached. It will be appreciated that other configurations of adjustable straps 51 and buckles 55 may be utilised to suit different types of strollers or prams. The strap arrangement 51 is fitted to the support frame 30 via slots 40 at each end of the frame. As shown in FIG. 8, when in a fitted position on the stroller 70, the carrier 10 is suspended from the frame 71 in the region of the handle 72, and is normally inclined with the base being forwardly disposed with respect to the top of the main body. In one embodiment the inclination of the carrier may for example be as a result of the location of the clubs within the carrier. That is the height of the club heads above the support frame when the clubs are in the normally held position will cause the carrier to lean towards the stroller or pram. Because the carrier is suspended so that it hangs from the stroller or pram in the region of its top, the carrier can swing freely towards or away from the stroller or pram. This allows for adjustment of the seat. In another embodiment the straps are positioned slightly forward of centre with respect to the support frame so as to assist in the correct weight distribution in order to make the carrier lean forwardly. Part of the straps is arranged to be positioned around part of the stroller frame 71, and can be held in place by a hook and loop fastener, for example.

The main body of the carrier may be provided with one or more pockets 58 in the side wall 25. These pockets can be used for storing golf balls, golf tees and other ancillary equipment. A mounting loop 57 for a hand towel is also provided.

Figure 9:
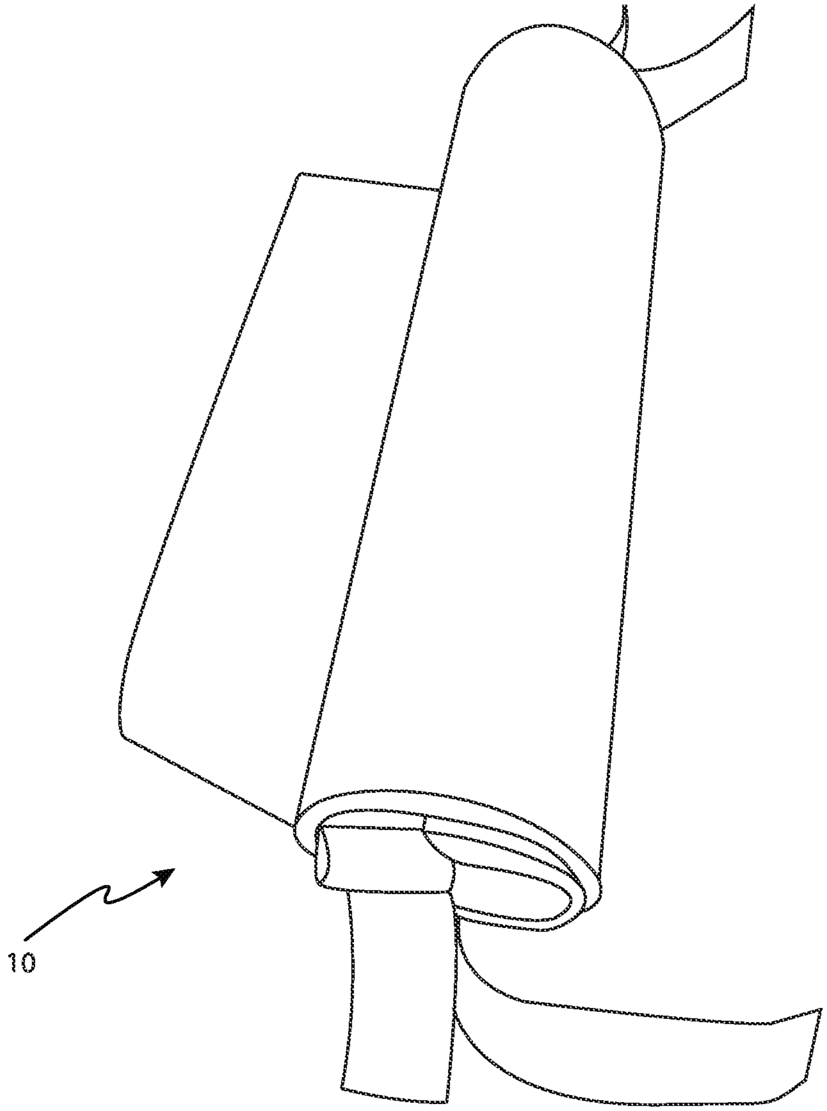

As illustrated in FIG. 9, the carrier 10 is also configured to be formed of a material which is substantially flexible in nature, so that it can be rolled up or folded into a stored position when not required for use.

In the forgoing description of preferred embodiments, specific terminology has been resorted to for the sake of clarity. However, the invention is not intended to be limited to specific terms so selected, and it is to be understood that each specific term includes all technical equivalents which operate in a similar manner to accomplish a similar technical purpose. Terms such as "front" and "rear", "inner" and "outer", "above", "below", "upper" and "lower" and the like are used as words of convenience to provide reference points and are not to be construed as limiting terms.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

In this specification the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, addition and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realise yet other embodiments. Further, each independent feature or component of any given assembly may constitute an additional embodiment.

The reference numerals in the following claims do not in any way limit the scope of the respective claims.

TABLE OF PARTS

Golf club carrier 10
Main body 12
Base 14
Top 16
Interior chamber 18
Access opening 20
Side wall 25
Panels 26/27
Sides 28/29
Support frame 30
Elongated member 32
Ends 33/34
Sides 36
Slots 40
Divider member 41
Apertures 42
Partitions 44
Zones 46
Attachment system 50
Strap arrangement 51
Straps 52
Buckle 53
Buckle 55
Grooves 56
Towel loop 57
Pockets 58
Golf club 60
Head 61
Shaft 62
Stroller 70
Frame 71
Handle 72
Seat 73
Surface engaging wheels 74

The invention claimed is:

1. A golf club carrier for use with a wheeled child-conveyance, the wheeled child-conveyance comprising a frame which includes a handle, surface engaging wheels for supporting the frame and a seat mounted to the frame for use by a child, the carrier being configured so as to be secured to the wheeled child-conveyance in a fitted position and comprising:

a main body which includes a base, a top, and a side wall, which together define an interior chamber therein, wherein the side wall is flexible in nature;

a rigid elongated support frame at the top of the main body over an access opening of the interior chamber, the rigid elongated support frame comprising elongated spaced apart outer sides and opposed outer ends and an elongated divider member which extends from one end of the rigid elongated support frame to the other end and having a plurality of separate access apertures arranged side-by-side in a single row which extends in a direction between the ends, each aperture being configured to receive a part of a golf club therethrough;

wherein the plurality of separate access apertures provide access to the interior chamber, the interior chamber being configured to receive a plurality of golf clubs so that in a holding position the plurality of golf clubs are at least partially disposed within the interior chamber;

wherein the carrier further includes an attachment system configured to releasably secure the carrier to the wheeled child-conveyance when in the fitted position so that the rigid elongated support frame is in the region of the handle and the carrier is suspended from the wheeled child-conveyance in a position rearwards of the seat so that it can swing freely towards or away from the seat, and the rigid elongated support frame is configured so that in the fitted position it extends in a direction from one side of the wheeled child-conveyance frame to the other; and wherein the main body is configured to be rolled around the rigid elongated support frame so as to adopt a stored position.

2. The golf club carrier according to claim 1, wherein the side wall comprises two main panels having opposed sides, the sides of each panel being operatively connected together.

3. The golf club carrier according to claim 1, wherein the base is rigid and strengthened relative to the side wall of the main body.

4. The golf club carrier according to claim 1, wherein the rigid elongated support frame is operatively connected to the side wall.

5. The golf club carrier according to claim 1, wherein the golf clubs comprise a shaft and a club head at one end thereof, the interior chamber being sized so that when the golf clubs are in the holding position within the interior chamber the club heads project from the interior chamber through the access opening so as to be disposed externally thereof.

6. The golf club carrier according to claim 1, including a plurality of partitions within the interior chamber for separating the interior chamber into a series of zones.

7. The golf club carrier according to claim 6, wherein each zone is associated with a respective one of the access apertures.

8. The golf club carrier according to claim 1, wherein the attachment system comprises a strap arrangement which can be mounted to the wheeled child-conveyance when the carrier is in the fitted position.

9. The golf club carrier according to claim 8, wherein the strap arrangement is disposed at or in the region of the top of the main body so that in the fitted position the carrier is suspended from the wheeled child-conveyance.

10. The golf club carrier according to claim 8, wherein when in the fitted position the carrier is inclined with the base being forwardly disposed relative to the top.

11. The golf club carrier according to claim 1, wherein the attachment system is operatively connected to the rigid elongated support frame.

12. The golf club carrier according to claim 1, further including one or more pockets in the main body.

* * * * *